United States Patent [19]

Goring

[11] Patent Number: 4,490,503

[45] Date of Patent: Dec. 25, 1984

[54] RAISING THE FLASH POINT OF STYRENE-CONTAINING, FREE-RADICAL CURING RESINS

[75] Inventor: John O. Goring, Kettering, England

[73] Assignee: Scott Bader Company Limited, Northamptonshire, England

[21] Appl. No.: 552,364

[22] Filed: Nov. 15, 1983

[30] Foreign Application Priority Data

Nov. 17, 1982 [GB] United Kingdom ............... 8232803

[51] Int. Cl.³ .............................................. C08K 5/02
[52] U.S. Cl. ...................................... 524/462; 524/473
[58] Field of Search .................... 524/462, 463, 473

[56] References Cited

U.S. PATENT DOCUMENTS

| 3,126,358 | 3/1964 | Lemmerich | 524/462 |
|---|---|---|---|
| 3,538,031 | 11/1970 | Rice | 524/462 |
| 3,564,088 | 2/1971 | Woodell | 524/462 |
| 3,711,430 | 1/1973 | Rubens | 524/462 |
| 3,864,078 | 2/1975 | Gealy et al. | 524/473 |
| 3,953,394 | 4/1976 | Fox et al. | 524/463 |
| 3,963,671 | 6/1976 | Turnbo | 260/45 |
| 3,983,185 | 9/1976 | Dorfman et al. | 260/863 |
| 4,107,230 | 8/1978 | Turnbo et al. | 260/861 |

FOREIGN PATENT DOCUMENTS

| 922059 | 3/1963 | United Kingdom | 524/462 |
|---|---|---|---|
| 1400929 | 7/1975 | United Kingdom | 524/473 |
| 1569070 | 6/1980 | United Kingdom | . |

*Primary Examiner*—Joseph L. Schofer
*Assistant Examiner*—N. Sarofim
*Attorney, Agent, or Firm*—Cushman, Darby & Cushman

[57] ABSTRACT

The flash point of a free radical curing resin containing styrene as cross-linkable monomer is raised to a value above 32° C. by incorporating in the resin a perhalohydrocarbon preferably containing fluorine as at least one of the halogen atoms and chlorine as another of the halogen atoms.

10 Claims, No Drawings

RAISING THE FLASH POINT OF STYRENE-CONTAINING, FREE-RADICAL CURING RESINS

FIELD OF THE INVENTION

This invention relates to raising the flash point of free-radical curing, styrene-containing resins.

BACKGROUND OF THE INVENTION

The flash point of styrene-containing unsaturated polyester resins and other free radical curing resins containing styrene as monomer such as vinyl esters and urethane acrylates is very close to 32° C. This is the temperature below which materials are classified as "Highly Inflammable" according to the British Highly Flammable Liquids and Liquid Petroleum Gases Regulations 1972. Such resins are therefore subject to storage and transport conditions laid out in the Regulations. Moreover the use of such resins in high risk areas e.g. mines is not desirable.

It is possible to replace the styrene monomer in these resins by other monomers and such monomers include diallyl phthalate, ethylene glycol dimethacrylate, bromostyrene, vinyl toluene, chlorostyrene, t-butyl styrene and p-methyl styrene. In fact resins based wholly on bromostyrene do not burn in the liquid state. (GB No. 1,569,070). However some of these monomers are not commercially available on a large scale or are not economically viable whilst others such as diallyl phthalate will not undergo cold cure. Ethylene glycol dimethacrylate yields resins of much higher viscosities than are desirable. The partial replacement of styrene by these alternatives monomers is not successful as the vapour pressure of styrene is the controlling factor in determining the flash point and the flash point of mixed monomer systems is always close to that of the most volatile monomer present.

SUMMARY OF THE INVENTION

We have now discovered that the addition of perhalohydrocarbons to styrenated free-radical curable resins raises their flash points to values above 32° C. so that they are no longer classified as highly inflammable. This may be achieved using only small quantities; it is preferred to use up to 10 parts per hundred by weight of resin (pphr) of the perhalohydrocarbon. At the same time these halohydrocarbons have little effect on the mechanical properties of the cured resins. This latter discovery is somewhat unexpected as it is known that some halohydrocarbons e.g. carbon tetrachloride can act as chain terminating agents in some free radical polymerisations, thus reducing molecular weight and so materially affecting the properties of the resins.

The perhalohydrocarbon, in which all hydrogens of the hydrocarbon have been replaced by halogen atoms preferably contains fluorine as at least one of the halogen atoms and more preferably additionally contains a halogen other than fluorine, especially chlorine, as at least one other of the halogen atoms.

It is especially preferred that the halohydrocarbon has a boiling point between ambient temperature (typically 20° C.) and 50° C. Typical of the halohydrocarbons that can be used are chlorofluorocarbons such as trichlorofluoromethane (commercially available as ARCTON®11), and 1,1,2-trichloro-1,2,2,-trifluoroethane (commercially available as ARKLONE®P). These have boiling points of 23.8° C. and 47.6° C. respectively. Perchlorohydrocarbons such as $CCl_4$ are also effective.

The resin systems to which this invention are applicable are styrenated free-radical curable resins such as unsaturated polyesters, vinyl esters and urethane acrylates.

The polyesters may be made by the condensation of unsaturated dibasic carboxylic acids or their anhydrides with one or more glycols modified if required by the inclusion of one or more saturated dicarboxylic acids or anhydrides. The polyesters formed by the condensation usually have acid values below 50 mg/KOH/g, and are dissolved in styrene monomer to which inhibitors are desirably added to yield resins which contain 30-50% (by weight) styrene monomer. Small quantities of mono or polybasic acids and/or mono or polyhydroxy compounds or other compounds such as cyclopentadiene may additionally be used in the condensation reaction.

The vinyl ester resins may be made by reacting acrylic or meth-acrylic acids with epoxide resins although other methods may be employed. They are likewise dissolved in styrene monomer desirably containing inhibitors.

The urethane acrylate resins may be made by the reaction of a diol, which may be polymeric, with a di- or poly-isocyanate and a hydroxy alkyl acrylate or methacrylate. These are again dissolved in styrene desirably containing inhibitors.

The liquid resins can be compounded with fillers, thixotropic agents and pigments if required.

By the method of this invention, which comprises incorporating in the abovementioned styrenated resin a halohydrocarbon, products can be obtained which have the desirable property of a higher flash point without significant detriment to their mechanical properties in cured form. Hence their prohibition by storage and transportation regulations may be avoided.

The invention is applicable to free radical curable resins for use in moulding or casting, but is especially applicable to resins suitable for formulation into rock anchors for use in mining applications. These rock anchors are polyester or similar cements hardened in situ in boreholes or like cavities in rock and serving to secure an anchor member such as a bolt or stays embedded in them. Conventionally, they are supplied as a sealed sausage-like, film-wrapped capsule which contains a mineral filled unsaturated polyester or similar resin system and also a catalyst for curing the system in a separate plastic film or glass phial.

DESCRIPTION OF PREFERRED EMBODIMENTS

The following Examples illustrate the invention:

EXAMPLE 1

The Flash Points of two unsaturated polyester resins CRYSTIC®D3601A and CRYSTIC®8001ALV were determind with and without the addition of chlorofluorohydrocarbons using Institute of Petroleum Method IP170. The results are shown in Table I below.

TABLE I

| Resin | Chlorofluoro Hydrocarbon p.p.h.r. | Flash Point (°C.) |
|---|---|---|
| CRYSTIC ® D3601A | — | 32.5 |
| CRYSTIC ® D3601A | ARCTON ® 11 | 36.5 |

TABLE I-continued

| Resin | Chlorofluoro Hydrocarbon p.p.h.r. | Flash Point (°C.) |
|---|---|---|
| CRYSTIC ® D3601A | ARKLONE ® P | 38.0 |
| CRYSTIC ® 8001ALV | — | 31.5 |
| CRYSTIC ® 8001ALV | ARCTON ® 11 | 39.0 |
| CRYSTIC ® 8001ALV | ARKLONE ® P | 40.5* |

CRYSTIC D3601A is an unsaturated polyester made from maleic anhydride, phthalic anhydride and propylene glycol with a reacted-in tertiary amine accelerator.
CRYSTIC D8001ALV is a similar resin with added tertiary amine accelerator.
*Best Method

EXAMPLE 2

Samples of CRYSTIC ®D3601A were compounded with chlorofluorohydrocarbons and catalysed with 1% benzoyl peroxide (50% active) and made into castings between glass plates. After curing for 24 hours at ambient temperature the castings were post cured for six hours at 40° C. The properties of the castings were determined and the results are shown in Table II.

TABLE II

| Property | CRYSTIC ® D3601A | +5 pphr ARCTON ® 11 | +10 pphr ARCTON ® 11 | +15 pphr ARCTON ® 11 | +5 pphr ARKLONE ® P |
|---|---|---|---|---|---|
| Barcol Hardness | 35.2 | 28.5 | 25.8 | —* | 29.3 |
| Heat Distortion Temp. (°C.) | 41.0 | 43.5 | 40.0 | 35.0 | 39.0 |
| Compression Strength (MPa) | 90.0 | 125.0 | 126.0 | 98.0 | 78.0 |
| Water Absorption B.S.2782 Method 502F mg | 14.15 | 16.3 | 17.3 | 17.6 | 16.6 |

*This resin was too soft to be measured for Barcol hardness, but its Shore D scale value was measured as 78.

EXAMPLES 3-5

Samples of CRYSTIC 196, CRYSTIC 272 and CRYSTIC 2-406 resins were taken and 5% ARKLONE P or ARCTON 11 added. This raised the flash point of the resin to a value above 32° C. The resins were catalysed and accelerated with methyl ethyl ketone peroxide (50%) and cobalt octoate (1% cobalt metal) and castings made between glass plates. After curing for 24 hours at ambient temperature the castings were post cured for 3 hours at 80° C. Samples were cut from the castings and tested by standard methods.

From the results it was apparent that the addition of the fluorochlorohydrocarbons had little influence on the mechanical properties and water absorption of the resins when compared to standard samples. These resisn are particularly suitable for general use in moulding and casting.

CRYSTIC ®196 is a general purpose phthalic anhydride based unsaturated polyester resin dissolved in styrene monomer.

CRYSTIC ®272 is an isophthalic acid based unsaturated polyester resin dissolved in styrene monomer.

CRYSTIC ®2-406 is a phthalic anhydride based unsaturated polyester resin dissolved in styrene monomer with modification to prevent styrene monomer loss on laminating.

I claim:

1. An essentially liquid resin composition curable by a free radical curing mechanism and containing styrene as solvent and cross-linkable monomer and a perhalohydrocarbon capable of raising the flash point of the resin.

2. A resin according to claim 1, wherein at least one of the halogen atoms of the perhalohydrocarbon is fluorine.

3. A resin according to claim 2, wherein at least one of the halogen atoms of the perhalohydrocarbon is other than fluorine.

4. A resin according to claim 3, wherein the perhalohydrocarbon is a perchlorofluorohydrocarbon.

5. A resin according to claim 4, wherein the perhalohydrocarbon is selected from trichlorofluoromethane and 1,1,2-trichloro-1,2,2,-trifluoroethane.

6. A resin according to claim 1, wherein the perhalohydrocarbon has a boiling point of from ambient temperature to 50° C. inclusive.

7. A resin according to claim 1, containing up to 10 pphr of the perhalohydrocarbon.

8. A resin according to claim 1, which is selected from unsaturated polyesters, vinyl esters and urethane acrylates.

9. A method of raising the flash point of a resin curable by a free radical curing mechanism and containing styrene as solvent and as cross-linkable monomers, which method comprises incorporating in the resin a perhalohydrocarbon.

10. In a resin curable by a free radical curing mechanism and containing styrene as solvent and as cross-linkable monomer, the improvement consisting of the presence of a perhalohydrocarbon for raising the flash point of the resin.

* * * * *